United States Patent
Men et al.

(10) Patent No.: US 8,708,612 B2
(45) Date of Patent: Apr. 29, 2014

(54) MILLING CUTTER HAVING SERRATED CUTTING INSERTS SPACED APART WITH VARYING AXIAL OFFSETS

(75) Inventors: Yuri Men, Haifa (IL); Eduard Astrakhan, Kiryat-Motzkin (IL)

(73) Assignee: Iscar, Ltd., Tefen (IL)

( * ) Notice: Subject to any disclaimer, the term of this patent is extended or adjusted under 35 U.S.C. 154(b) by 239 days.

(21) Appl. No.: 13/207,233

(22) Filed: Aug. 10, 2011

(65) Prior Publication Data

US 2012/0039675 A1    Feb. 16, 2012

(30) Foreign Application Priority Data

Aug. 16, 2010  (IL) .......................................... 207625

(51) Int. Cl.
*B23C 5/20* (2006.01)
(52) U.S. Cl.
CPC ........................ *B23C 5/20* (2013.01)
USPC .................. 407/61; 407/58; 407/55; 407/42
(58) Field of Classification Search
USPC .............................. 407/42, 55, 58, 61, 62, 63
IPC ............................... B23C 5/00,5/02, 5/10, 5/20
See application file for complete search history.

(56) References Cited

U.S. PATENT DOCUMENTS

| | | | |
|---|---|---|---|
| 3,574,911 A | 4/1971 | Penoyar et al. | |
| 3,636,602 A | 1/1972 | Owen | |
| 3,701,187 A | 10/1972 | Erkfritz | |
| 3,875,631 A | 4/1975 | Malinchak | |
| 4,140,431 A * | 2/1979 | Friedline et al. | 407/114 |
| 4,573,831 A * | 3/1986 | Lacey | 407/42 |
| 4,729,697 A | 3/1988 | Lacey | |
| 4,794,665 A * | 1/1989 | Peters | 407/58 |
| 4,936,719 A * | 6/1990 | Peters | 407/42 |
| 5,028,175 A * | 7/1991 | Pawlik | 407/40 |
| 8,096,734 B2 * | 1/2012 | Sjoo | 407/23 |

FOREIGN PATENT DOCUMENTS

| | | | |
|---|---|---|---|
| SU | 1313588 A * | 5/1987 | |
| SU | 1386383 A * | 4/1988 | |

OTHER PUBLICATIONS

International Search Report dated Oct. 5, 2011 issued in counterpart PCT application (No. PCT/IL2011/000578).

* cited by examiner

*Primary Examiner* — Andrea Wellington
*Assistant Examiner* — Alan Snyder
(74) *Attorney, Agent, or Firm* — Womble Carlyle

(57) ABSTRACT

A milling cutter includes a cutter body and at least three circumferentially spaced insert pockets, axially offset one with respect to the other, each having a replaceable cutting insert secured thereto. Each cutting insert has at least two identical straight serrated cutting edges and all the cutting inserts are identical. A first insert pocket (30) is an axially forwardmost insert pocket. A second insert pocket is axially offset from the first insert pocket by a first offset distance that is smaller than an offset distance associated with any other pair of axially adjacent insert pockets.

12 Claims, 3 Drawing Sheets

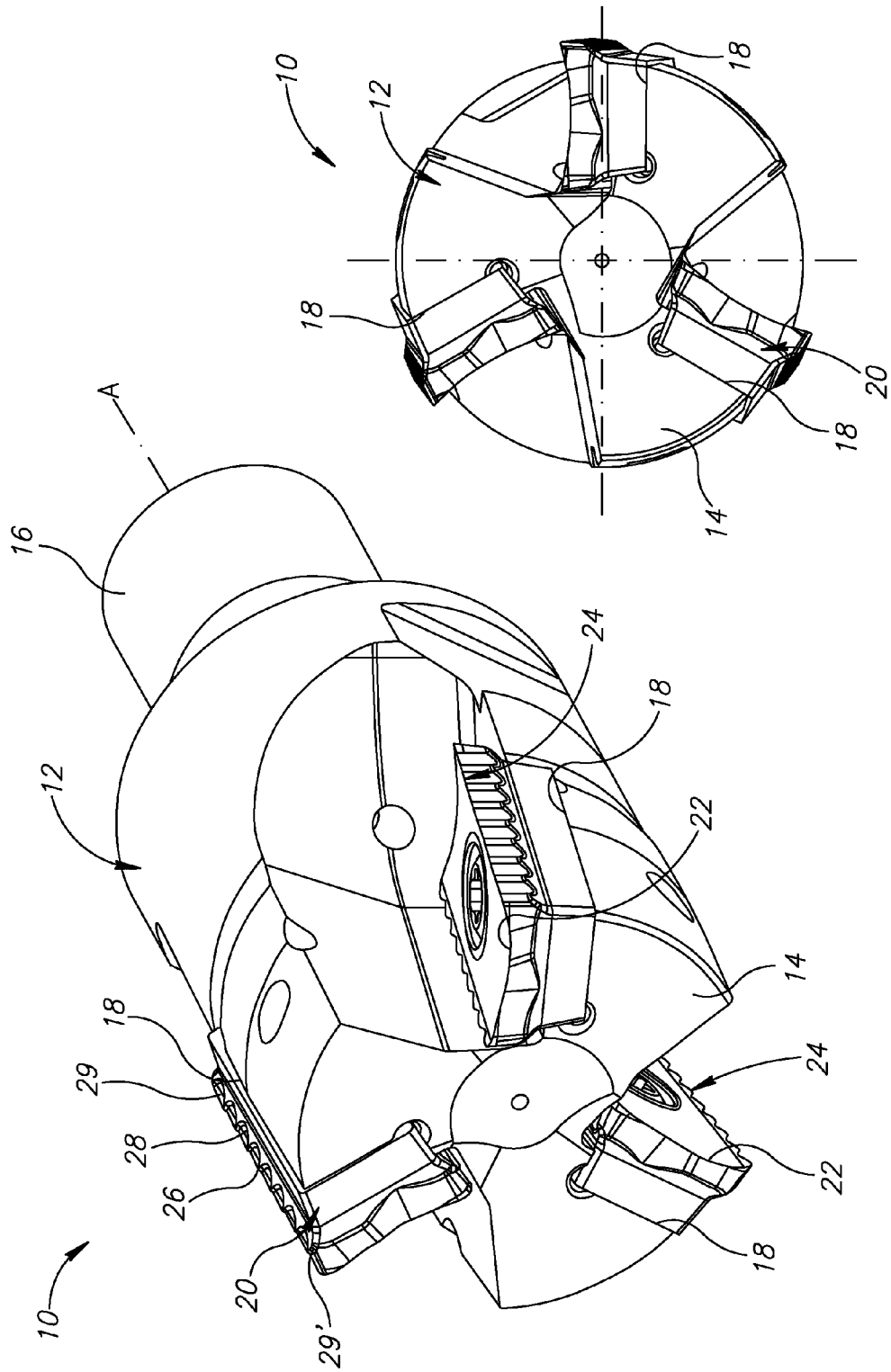

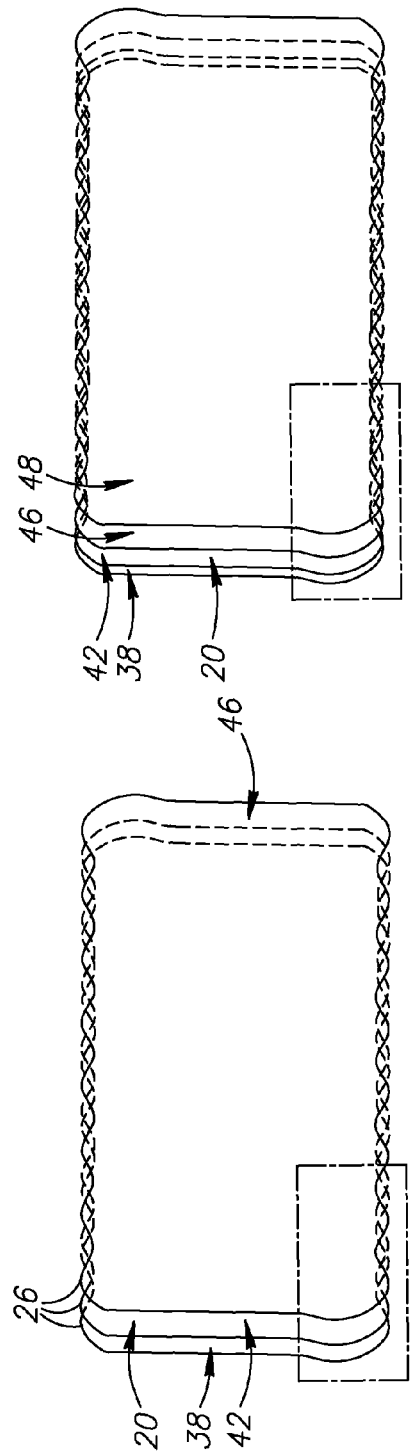
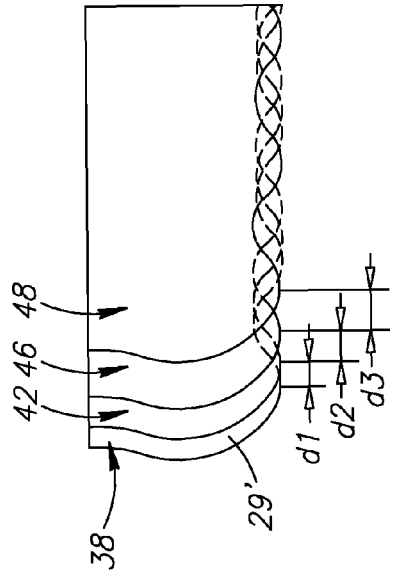
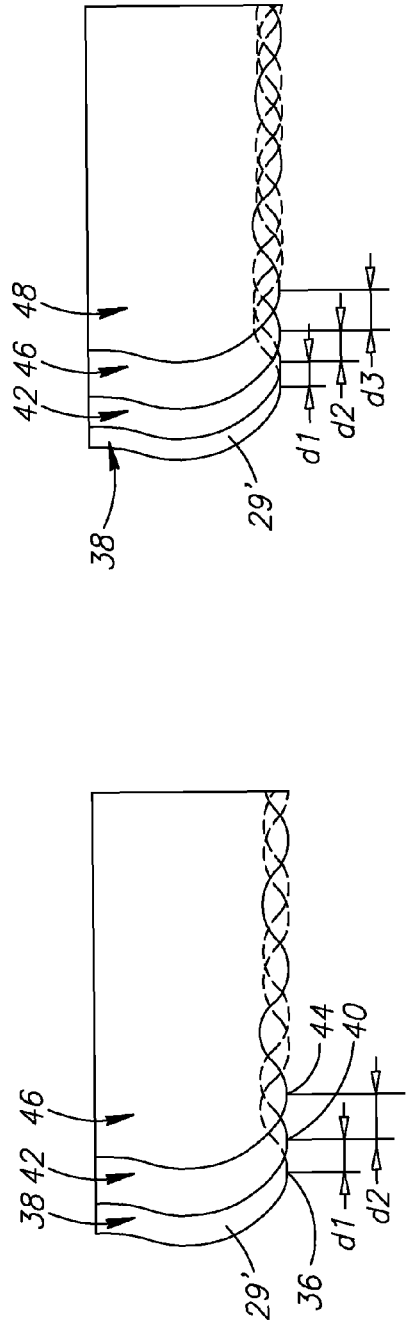

MILLING CUTTER HAVING SERRATED CUTTING INSERTS SPACED APART WITH VARYING AXIAL OFFSETS

FIELD OF THE INVENTION

The subject matter of the present application relates to a milling cutter having indexable cutting inserts with serrated cutting edges for metal cutting operations.

BACKGROUND OF THE INVENTION

Within the field of metal cutting operations, there are known many milling cutters having cutting inserts with serrated cutting edges, which enable higher metal removal rates as compared with cutting inserts having non-serrated cutting edges. However, this is achieved at the expense of rougher surface finish. In order to improve the surface finish, the cutting inserts are mounted on the milling cutter with the serrations of consecutive cutting inserts offset, or out of phase, in relation to each other. Examples of tools with such cutting inserts can be found in U.S. Pat. Nos. 3,574,911, 3,636,602 and 3,875,631. Nevertheless, these types of cutting tools suffer from a disadvantage in that the axially forward most serration of the operative cutting edge of the axially forward most cutting insert (i.e. the cutting insert which is closest the face of the milling cutter) is more exposed than the other serrations of that cutting insert and than the serrations of the other cutting inserts, and therefore is exposed to wear and is vulnerable to breakage.

A solution to this deficiency, as suggested by several tool manufacturers, is to provide an external member to support the exposed serration. For example, U.S. Pat. No. 3,701,187 discloses ribbed cutting inserts spaced angularly around the periphery of a supporting disk that are staggered relative to one another along the axis of the disk to remove laterally spaced chips from the bottom of the slot, while the sides of the slot are face milled by side cutting inserts spaced angularly from the ribbed inserts. However, the additional side cutting inserts lead to unnecessary operation costs which could be saved. For example, replacement of the cutting inserts is a task that is substantially time consuming and requires additional tools for operating the process, especially if the additional cutting inserts are not identical to the ribbed cutting inserts. Furthermore, the additional cutting inserts are a redundant expense. Therefore, such a solution is, of course, money, labor and time consuming.

SUMMARY OF THE INVENTION

In accordance with the subject matter of the present application there is provided a milling cutter including a cutter body having a longitudinal axis extending in a forward to rearward direction and at least three insert pockets adjacent a forward end surface of the cutter body and circumferentially spaced one from the other.

A replaceable cutting insert is secured to each insert pocket, each cutting insert having at least two identical straight serrated cutting edges. All the cutting inserts are identical.

A first insert pocket is an axially forwardmost insert pocket, and all the insert pockets are axially offset one with respect to the other.

In accordance with embodiments of the present application, a second insert pocket is axially offset from the first insert pocket by a first offset distance that is smaller than an offset distance associated with any other pair of axially adjacent insert pockets.

In accordance with embodiments of the present application, each serrated cutting edge has crests and troughs which are uniformly spaced.

In accordance with embodiments of the present application, each cutting insert has a generally rectangular form.

In accordance with embodiments of the present application, two of the at least two identical straight serrated cutting edges are parallel to each other.

BRIEF DESCRIPTION OF THE FIGURES

For a better understanding of the present application and to show how the same may be carried out in practice, reference will now be made to the accompanying drawings, in which:

FIG. 1 is a perspective view of a milling cutter with three cutting inserts;

FIG. 2 is a top view of the milling cutter of FIG. 1;

FIG. 4 is a schematic view of three inserts in a milling cutter superimposed on each other;

FIG. 5 is a detail of FIG. 4;

FIG. 6 is a schematic view of four inserts in a milling cutter superimposed on each other; and FIG. 7 is a detail of FIG. 6.

DETAILED DESCRIPTION OF THE PRESENT INVENTION

Figure 3:
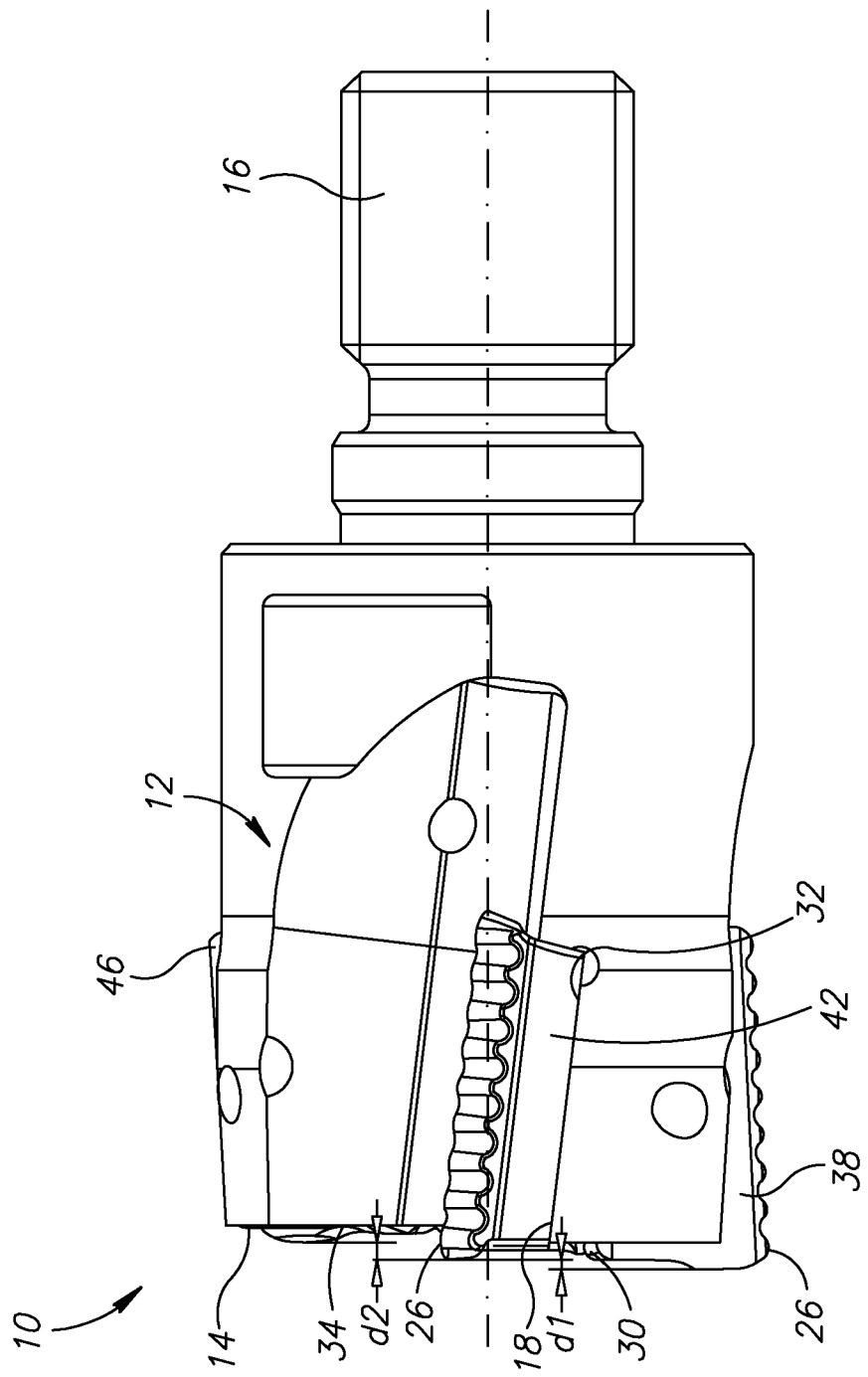
FIG. 3 is a side view of the milling cutter of FIG. 1.

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

Reference is made to FIGS. 1 and 2, showing a milling cutter 10 having an axis of rotation A extending in a forward to rearward direction and a cutter body 12 having a forward end surface 14 and a rear shank 16. The cutter body 12 includes three insert pockets 18 adjacent the forward end surface 14 of the cutter body 12 and circumferentially spaced one from the other. Each insert pocket 18 has a replaceable and indexable cutting insert 20 secured thereto. All the cutting inserts 20 are identical. Each cutting insert 20 has a generally rectangular form having two opposing identical minor edges 22 and two opposing identical major edges 24, where the major edges 24 are longer than the minor edges 22. The major edges 24 are straight serrated cutting edges having crests 26 and troughs 28, defining serrations 29, which are uniformly spaced. The major edges 24 are straight serrated cutting edges in the sense that all the crests 26 lie on a common straight tangent line. Each pair of serrated cutting edges 24 is parallel to each other. In other words, the common straight tangent lines of each of the serrated cutting edges 24 of the pair of serrated cutting edges 24 are parallel. Each cutting insert 20 in the milling cutter 10 has a radially outer major cutting edge 24. Each radially outer major cutting edge 24 constitutes an operative cutting edge during a milling operation. Each operative major cutting edge 24 has an axially forward serration 29' which is closer to the forward end surface 14 of the cutter body 12 than the other serrations 29 of that cutting edge 24.

The insert pockets 18 are axially offset one from the other by given offset distances. Since the insert pockets 18 are axially offset one with respect to the other and since the cutting inserts 20 are identical, the cutting inserts 20 are also axially offset one with respect to the other by the same offset distances defined by the insert pockets 18. Therefore, the offset distances of the insert pockets 18 can be indicated by the offset distances of the cutting inserts 20 secured in the insert pockets 18 and vice versa. As can be seen in FIG. 3, a first insert pocket 30 is an axially forwardmost insert pocket. That is to say, the first insert pocket 30 is furthest from the rear shank 16 than the other insert pockets. Therefore, the first insert pocket 30 seats first cutting insert 38 such that the axially forward serration of first cutting insert 38 is forwardmost among the axially forward serrations of all cutting inserts. A second insert pocket 32 seats second cutting insert 42 such that the axially forward serration of second cutting insert 42 is axially rearwardly offset from the axially forward serration of first cutting insert 38 by an offset distance d1. A third insert pocket 34 seats third cutting insert 46 such that the axially forward serration of third cutting insert 46 is axially rearwardly offset from the axially forward serration of second cutting insert 42 by an offset distance d2. The offset distance d1 is smaller than the offset distance d2. It is understood that since the first, second and third cutting inserts are identical, features of their corresponding insert pockets, such as side walls and threaded bores for accommodating clamping screws, may have similar offset distances from one insert pocket to the next.

Attention is now drawn to FIGS. 4 and 5, showing the offset distances of the three cutting inserts 20 with respect to each other. These figures also schematically show the overlap of the cutting inserts and in particular the overlap of the serrations of the operative cutting edges during a milling operation. The offset distances can be measured between two adjacent crests 26 of two adjacent cutting inserts 20, namely, the distance between a crest 36 of a first cutting insert 38 and a crest 40 of a second cutting insert 42, or the distance between the crest 40 of the second cutting insert 42 and a crest 44 of a third cutting insert 46. The first cutting insert 38 is the axially forward most cutting insert of all the cutting inserts 20. The second cutting insert 42 is axially offset from the first cutting insert 38 by the offset distance d1, with the axially forward serration 29' of the second cutting insert 42 overlapping the axially forward serration 29' of the first cutting insert 38. The third cutting insert 46 is axially offset from the second cutting insert 42 by the offset distance d2, with the axially forward serration 29' of the third cutting insert 46 overlapping the axially forward serration 29' of the second cutting insert 42. The offset distance d1 is smaller than the offset distance d2. By this arrangement, the axially forward serration 29' of the first cutting insert 38 is provided with a greater overlap by the axially forward serration 29' of the second cutting insert 42 than would be the case if the axial offsets were equal. Therefore, the exposed area of the axially forward serration 29' of the first cutting insert 38 is minimized.

The number of insert pockets in the cutter body is not limited to three and may be any number. For example, the cutter body 12 may include four insert pockets. Attention is now drawn to FIGS. 6 and 7, showing the offset distances of four cutting inserts 20 with respect to each other. The second cutting insert 42 is axially offset from the first cutting insert 38 by the offset distance d1, with the axially forward serration 29' of the second cutting insert 42 overlapping the axially forward serration 29' of the first cutting insert 38. The reference character d1 is used to signify the offset distance between the first and second cutting inserts 38, 42 (or, equivalently, the offset distance between the first and second insert pockets 30, 32) in both the case in which the cutter body 12 has three insert pockets and in the case in which the cutter body 12 has four insert pockets. However, it will be appreciated that the actual numerical value of d1 may be different in the two cases. The same is true for the other reference character d2. The third cutting insert 46 is axially offset from the second cutting insert 42 by the offset distance d2, with the axially forward serration 29' of the third cutting insert 46 overlapping the axially forward serration 29' of the second cutting insert 42. A fourth cutting insert 48 is axially offset from the third cutting insert 46 by an offset distance d3, with the axially forward serration 29' of the fourth cutting insert 48 overlapping the axially forward serration 29' of the third cutting insert 46. The offset distances d2, d3 are not necessarily equal. If the offset distances d2, d3 are not equal then one of them defines a minimum offset distance. If the offset distances d2, d3 are equal then they both define a minimum offset distance. The offset distance d1 is smaller than the offset distance d2 and the offset distance d3. In other words, d1 is smaller than the minimum offset distance of the other pairs of cutting inserts 42, 46 and 46, 48. Once again, the exposed area of the first cutting insert 38 is more protected by the second cutting insert 42. The offset distances d2, d3 can be identical or different, depending on the specific application, the configuration of the cutting inserts 20 mounted therein and the operation needs. As seen in both FIGS. 5 and 7, the axially forward serration 29' of a given cutting insert may constitute the forward most portion of that cutting insert.

As mentioned above, the milling cutter 10 may include a greater number of insert pockets 18, for example five, six, seven or more, each seating an identical cutting insert. All cutter bodies 12, independent of the number of insert pockets 18, include the feature that the offset distance d1 between the axially forward serrations of the first and second inserts is smaller than the minimum among such offset distances associated with any other pair of axially adjacent cutting inserts, e.g., the offset distance associated with cutting insert pair 42, 46 and cutting insert pair 46, 48. Similarly, the offset distance d1 between the first insert pocket 30 and the second insert pocket 32 is smaller than the offset distance associated with any other pair of axially adjacent insert pockets, e.g., the offset distance between insert pocket pair 32, 34. This provides the axially forward serration 29' of the first cutting insert 38 with a greater overlap by the axially forward serration 29' of the second cutting insert 42 than would be the case if all the axial offsets were equal and the axially forward serration of each subsequent cutting inserts overlapped the axially forward serration of the immediately preceding cutting insert.

Although the present application has been described to a certain degree of particularity, it should be understood that various alterations and modifications could be made without departing from the scope of the application as hereinafter claimed.

What is claimed is:
1. A milling cutter (10) comprising:
   a cutter body (12) having a longitudinal axis (A) extending in a forward to rearward direction and at least three insert pockets (18) adjacent a forward end surface (14) of the cutter body (12) and circumferentially spaced one from the other; and
   a replaceable cutting insert (20, 38, 42, 46, 48) secured to each insert pocket (18), each cutting insert (20) having at least two identical straight serrated cutting edges (24) and an operative axially forward serration (29'), all the cutting inserts (20) being identical; wherein:

a first insert pocket (30) is an axially forwardmost insert pocket;

all the insert pockets (18) are axially offset one with respect to the other; and a second insert pocket (32) is axially offset from the first insert pocket (30) by a first offset distance (d1) that is smaller than an offset distance (d2, d3) associated with any other pair of axially adjacent insert pockets;

the operative axially forward serration (29') of a second cutting insert (42) seated in the second insert pocket (32) overlaps the operative axially forward serration (29') of a first cutting insert (38) seated in the first insert pocket (30); and the operative axially forward serration (29') of a third cutting insert (46) seated in a third insert pocket (34) overlaps the operative axially forward serration (29') of the second cutting insert (42) seated in the second insert pocket (32).

2. The milling cutter (10) according to claim 1, wherein each serrated cutting edge (24) comprises crests (26) and troughs (28), the crests and troughs being uniformly spaced.

3. The milling cutter (10) according to claim 1, wherein each cutting insert (20) has a generally rectangular form.

4. The milling cutter (10) according to claim 1, wherein two of the at least two identical straight serrated cutting edges (24) are parallel to each other.

5. The milling cutter (10) according to claim 1, wherein:

two or more other pairs of axially adjacent insert pockets have a same second offset distance; and the first offset distance is smaller than the second offset distance.

6. The milling cutter (10) according to claim 1, wherein:

at least four insert pockets are provided; and the first offset distance is smaller than offset distances associated with all other pairs of axially adjacent insert pockets.

7. A milling cutter (10) comprising:

a cutter body (12) having a longitudinal axis (A) extending in a forward to rearward direction and at least three insert pockets (18) adjacent a forward end surface (14) of the cutter body (12) and circumferentially spaced one from the other;

a replaceable cutting insert (20) secured to each insert pocket (18), each cutting insert (20) having at least two identical straight serrated cutting edges (24) and an operative axially forward serration (29'); wherein:

all the cutting inserts (20) are identical;

the operative axially forward serrations (29') of the cutting inserts are axially offset one with respect to another;

the operative axially forward serration (29') of a first of the cutting inserts is axially forward of the operative axially forward serration (29') of a second of the cutting inserts by a first offset distance (d1);

the first offset distance (d1) is smaller than an offset distance (d2, d3) associated with any other pair of axially adjacent cutting inserts (20);

the operative axially forward serration (29') of the second of the cutting inserts overlaps the operative axially forward serration (29') of the first of the cutting insert; and the operative axially forward serration (29') of a third of the cutting inserts (46) overlaps the operative axially forward serration (29') of the second of the cutting inserts.

8. The milling cutter (10) according to claim 7, wherein each serrated cutting edge (24) comprises crests (26) and troughs (28), the crests and troughs being uniformly spaced.

9. The milling cutter (10) according to claim 7, wherein each cutting insert (20) has a generally rectangular form.

10. The milling cutter (10) according to claim 7, wherein two of the at least two identical straight serrated cutting edges (24) are parallel to each other.

11. The milling cutter (10) according to claim 7, wherein:

two or more other pairs of axially adjacent cutting inserts have a same second offset distance; and the first offset distance is smaller than the second offset distance.

12. The milling cutter (10) according to claim 7, wherein:

at least four insert pockets are provided; and the first offset distance is smaller than offset distances associated with all other pairs of axially adjacent cutting inserts.

* * * * *